(12) United States Patent
Olney et al.

(10) Patent No.: US 8,306,098 B1
(45) Date of Patent: Nov. 6, 2012

(54) METHOD FOR ERROR DISPLAY OF ORTHOGONAL SIGNALS

(75) Inventors: Doug Olney, Santa Rosa, CA (US); Mike Hart, Healdsburg, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1045 days.

(21) Appl. No.: 11/839,101

(22) Filed: Aug. 15, 2007

(51) Int. Cl.
*H04B 3/46* (2006.01)
*H04B 17/00* (2006.01)
*H04Q 1/20* (2006.01)

(52) U.S. Cl. ..................... 375/224; 324/76.11
(58) Field of Classification Search .................. 375/224, 375/226, 377; 324/76.11, 158.1
See application file for complete search history.

(56) References Cited

U.S. PATENT DOCUMENTS

| | | | | |
|---|---|---|---|---|
| 3,755,738 A | * | 8/1973 | Gitlin et al. | 375/235 |
| 4,574,246 A | * | 3/1986 | Yoshida | 329/309 |
| 4,639,934 A | * | 1/1987 | Zuranski et al. | 375/226 |
| 5,511,098 A | * | 4/1996 | Gardner | 375/340 |
| 6,873,860 B2 | * | 3/2005 | Hildebrand et al. | 455/561 |
| 6,949,975 B2 | * | 9/2005 | Ring | 330/149 |
| 7,142,609 B2 | * | 11/2006 | Terreault et al. | 375/261 |
| 7,333,566 B2 | * | 2/2008 | Nakao et al. | 375/316 |
| 7,724,842 B2 | * | 5/2010 | Luce | 375/322 |
| 7,792,181 B2 | * | 9/2010 | Yamanouchi et al. | 375/224 |
| 2007/0121712 A1 | * | 5/2007 | Okamoto | 375/222 |
| 2009/0208120 A1 | * | 8/2009 | Printz | 382/232 |
| 2009/0262795 A1 | * | 10/2009 | Bouillet | 375/232 |

* cited by examiner

*Primary Examiner* — Jean B Corrielus

(57) ABSTRACT

A method for displaying a plurality of error measures for an error-containing digitally modulated signal formed of a first and a second orthogonal component includes: determining for each digital value a value for an error-free version of the modulated signal; determining for each digital value a value for the error-containing version of the modulated signal; determining for each digital value a vector difference between the value for the error-containing version of the modulated signal and the respective value for the error-free version of the modulated signal; and displaying the vector differences on a two-dimensional display, each difference being displayed with respect to the respective value for the error-free version of the modulated signal, the display providing the plurality of error measures.

5 Claims, 3 Drawing Sheets

METHOD FOR ERROR DISPLAY OF ORTHOGONAL SIGNALS

BACKGROUND OF THE INVENTION

The present invention relates to the measurement of electrical signals and, in particular, the measurement of characteristics of modulated orthogonal signals.

A common method of transmitting digital information is to modulate two orthogonal signals with digital information. The transmitted signal may then be considered to be composed of a real component and an imaginary component. Quadrature amplitude modulation (QAM) is an example of such a technique, where two sine waves, ninety degrees out of phase (e.g., sine and cosine) are modulated by the digital information.

A useful tool for examining the performance characteristics of a digitally modulated signal formed of a first and a second orthogonal component is a constellation diagram. The signal of interest is plotted on two axes, one for the real (e.g., in-phase) component and one for the imaginary (quadrature-phase) component. For an error-free signal (e.g., no noise, no gain errors, no symbol clock error, no frequency offsets), the constellation diagram will simply be a pattern of points (e.g., 64-QAM—rectangular grid, 8-PSK—circle), each point representing a possible digital value. In practice, the points are typically blurred by errors into clusters. The first and second orthogonal components may be provided by demodulating the modulated signal with respect to a respective orthogonal signal. The constellation diagram can then be displayed on a suitable display device, such as an oscilloscope. A specialized instrument that demodulates the signal and displays the diagram may also be employed.

Referring to FIGS. 1 and 2, examples of a constellation diagram for two 64-QAM signals are shown. The signal of FIG. 1 has very little error and thus the clusters appear nearly as points. The signal of FIG. 2 has a large error content resulting in large clusters.

The usefulness of constellation diagrams often lies in the size and shape of the clusters. The size of the clusters around each constellation point gives a direct estimate of the Error Vector Magnitude (EVM) and the shape of the clusters can indicate problems such as gain errors between the in-phase and quadrature-phase processing, frequency offset and symbol clock error. The clusters thus provide an error measure for the modulated signal. However, the example clusters of FIG. 1 are so small that the shapes are difficult to assess. In contrast, the clusters of FIG. 2 are so large that overlap occurs. In both cases, it is difficult to assess the individual cluster shapes.

It is known to provide a zoom function for a constellation diagram displayed on a specialized measurement instrument to allow portions of the diagram to be enlarged for better viewing. However, when zoomed in on a cluster, the ability to assess the overall diagram and most other clusters is lost.

SUMMARY OF THE INVENTION

A method for displaying a plurality of error measures for an error-containing digitally modulated signal formed of a first and a second orthogonal component includes: determining for each digital value a value for an error-free version of the modulated signal; determining for each digital value a value for the error-containing version of the modulated signal; determining for each digital value a vector difference between the value for the error-containing version of the modulated signal and the respective value for the error-free version of the modulated signal; and displaying the vector differences on a two-dimensional display, each difference being displayed with respect to the respective value for the error-free version of the modulated signal, the display providing the plurality of error measures.

DESCRIPTION OF THE PREFERRED EMBODIMENTS

The present invention allows both the shape of individual clusters and the entire constellation diagram to be seen at the same time. This is done by scaling the differences between each ideal constellation point and the actual values measured for that cluster.

Figure 2:
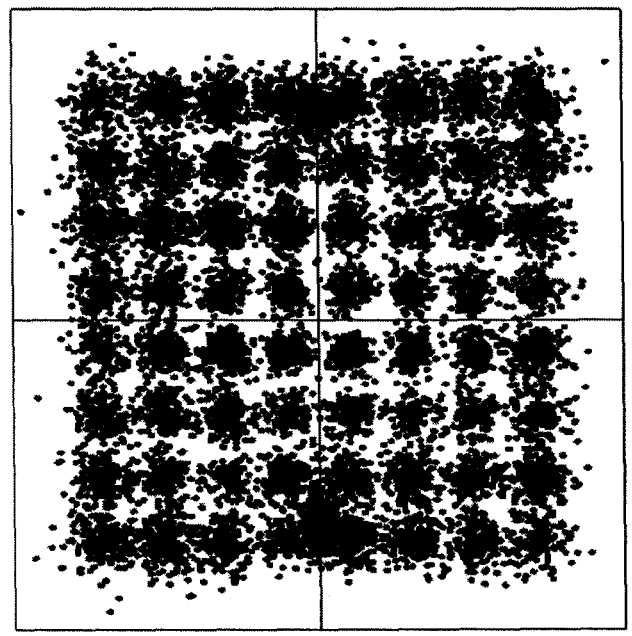
FIG. 2 is an example of a constellation diagram of a large error digitally 64-QAM signal.

For example, in any digital detection scheme that calculates EVM, both the measured symbols $S(n)$ and the ideal constellation reference value $\Gamma(n)$, are available. $S(n)$ and $\Gamma(n)$ are complex valued, n varying from 0 to N−1 where N is the number of symbols. In the constellation diagrams of FIGS. 1 and 2, the clusters are just plots of the $S(n)$ values. The error vectors are $S(n)-\Gamma(n)$.

Figure 1:
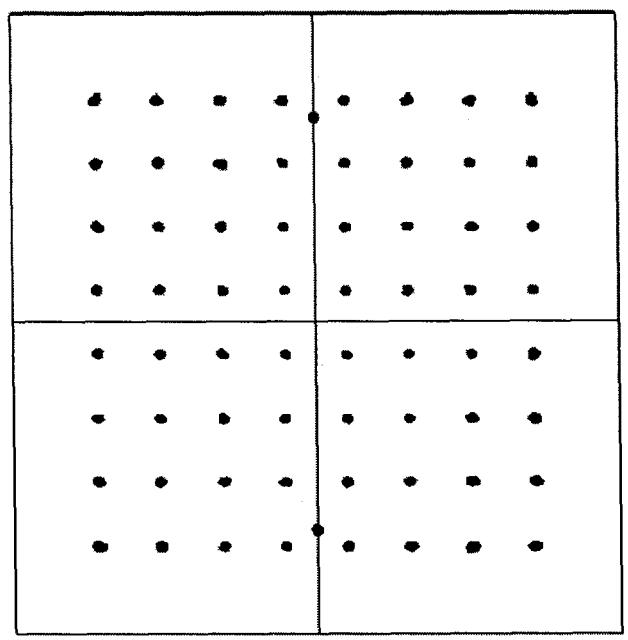
FIG. 1 is an example of a constellation diagram of a low error 64-QAM signal.
Figure 3:
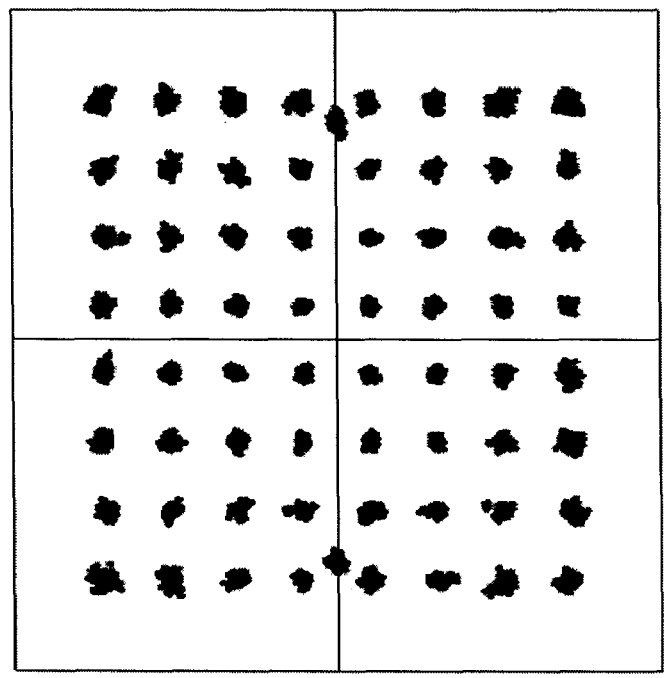
FIG. 3 is an example of a constellation diagram of the signal of FIG. 1 with the error scaled to emphasize the error characteristics of the signal about ideal constellation points.

Referring to FIG. 3, the tiny clusters of FIG. 1 may all be emphasized by displaying $S_s(n)=K(S(n)-\Gamma(n))+\Gamma(n)$, where K is a real-valued scaling constant (e.g., 4.0). As can be seen in FIG. 3, displaying $S_s(n)$ instead of $S(n)$ allows the shapes of all of the clusters to be seen at the same time so that overall performance can be assessed. If a cluster of FIG. 1 was merely zoomed to the same level, a large portion of the constellation diagram would be off the edges of the display.

Figure 4:
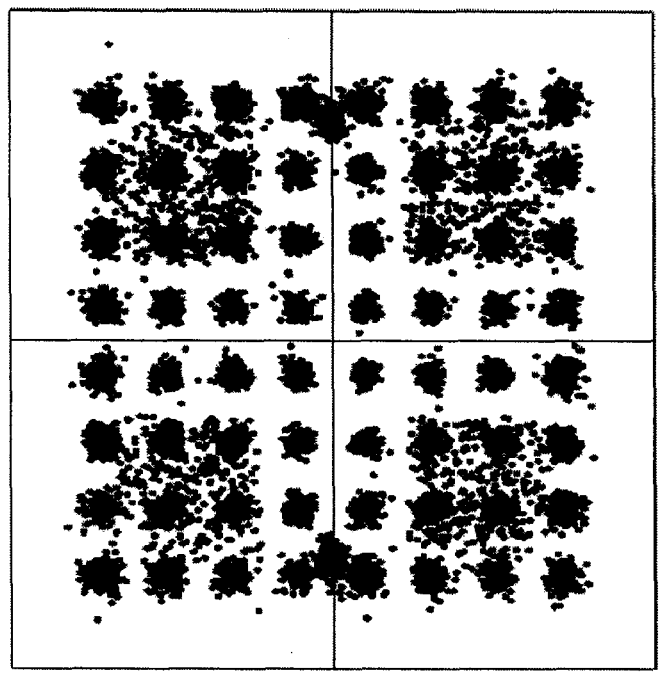
FIG. 4 is an example of a constellation diagram of the signal of FIG. 2 with the error scaled to localize the error characteristics of the signal about ideal constellation points.

In a similar manner, $S_s(n)$ may be used to localize large clusters. Referring to FIG. 4, the large (even overlapping) clusters of FIG. 2 can be localized using $S_s(n)=K(S(n)-\Gamma(n))+\Gamma(n)$ to better assess their shapes. For example, a value of $K=0.5$ may be used. The use of a conventional zoom effect would not provide this localization of the clusters.

This technique is of course not limited to just QAM modulation. It is applicable to any digital modulation scheme that uses at least a pair of orthogonal signals to construct its symbol space.

For each digital value, a value for an error-free version of the modulated signal is determined. For each digital value, a value for the error-containing version of the modulated signal is determined. For each digital value, a vector difference between the value for the error-containing version of the modulated signal and the respective value for the error-free version of the modulated signal is determined. The vector differences are displayed on a two-dimensional display with respect to the respective value for the error-free version of the modulated signal. Thus, the display provides a pattern of clusters representing error measures.

The vector differences may be scaled to emphasize errors in the modulated signal or to localize errors in the modulated signal.

Figure 5:
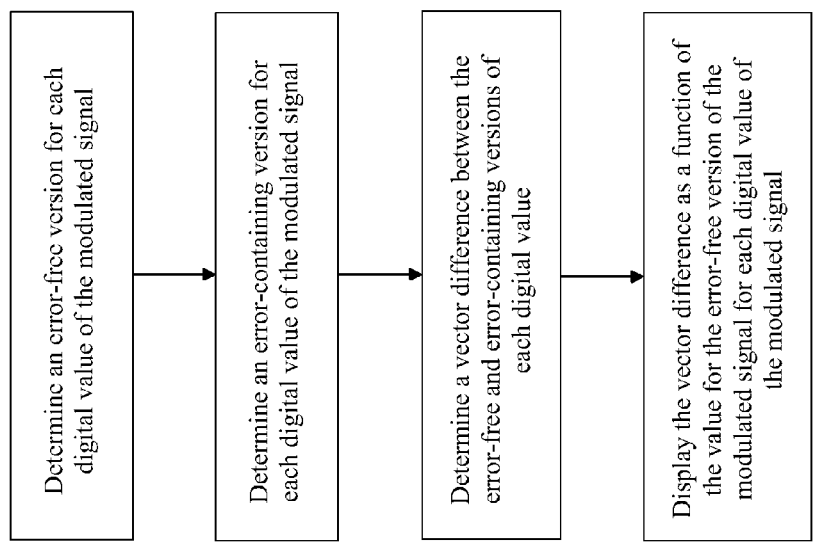
FIG. 5 is a flowchart illustrating one embodiment of the method of the current invention.

FIG. 5 illustrates one implementation of the method of the present invention schematically in the form of a flowchart. In this embodiment, an error-free version for each digital value of the modulated signal is determined. Next, an error-containing version is determined for each digital value in the modulated signal. A vector difference between the error-free and error-containing versions of each digital value is determined and displayed on a two-dimensional display of an instrument to provide a plurality of error measures. In one aspect of the invention, the vector differences are scaled as part of the displaying operation. The scaling can emphasize errors or localize errors.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for displaying a plurality of error measures for an error-containing digitally modulated signal formed of a first and a second orthogonal component, said method comprising:

determining for each digital value a value for an error-free version of said modulated signal;

determining for each digital value a value for said error-containing version of said modulated signal;

determining for each digital value a vector difference between said value for said error-containing version of said modulated signal and the respective value for said error-free version of said modulated signal; and displaying said vector differences on a two-dimensional display of an instrument that receives said vector differences, each difference being displayed as a point, said points forming a cluster of points, one such cluster corresponding to each determined value of said error-free version of said modulated signal, and being located at a position in said display that is determined by that error-free version.

2. A method according to claim 1, wherein said vector differences are scaled prior to being displayed to reduce overlap between adjacent clusters.

3. A method according to claim 1 wherein said vector differences are scaled to emphasize errors.

4. A method according to claim 1 wherein said vector differences are scaled to localize errors.

5. A method according to claim 1, wherein said determining for each digital value a value for said error-containing version of said modulated signal is by a process of demodulation.

* * * * *

UNITED STATES PATENT AND TRADEMARK OFFICE
CERTIFICATE OF CORRECTION

| | | |
|---|---|---|
| PATENT NO. | : 8,306,098 B1 | Page 1 of 1 |
| APPLICATION NO. | : 11/839101 | |
| DATED | : November 6, 2012 | |
| INVENTOR(S) | : Doug Olney et al. | |

It is certified that error appears in the above-identified patent and that said Letters Patent is hereby corrected as shown below:

In column 4, line 20, in Claim 3, delete "claim 1" and insert -- claim 1, --, therefor.

In column 4, line 22, in Claim 4, delete "claim 1" and insert -- claim 1, --, therefor.

Signed and Sealed this
Eighteenth Day of December, 2012

David J. Kappos
*Director of the United States Patent and Trademark Office*